(12) United States Patent
Gusmorino et al.

(10) Patent No.: US 7,992,103 B2
(45) Date of Patent: Aug. 2, 2011

(54) SCALING ICONS FOR REPRESENTING FILES

(75) Inventors: Paul A. Gusmorino, Seattle, WA (US); Tyler K. Beam, Redmond, WA (US); Raymond J. Chen, Redmond, WA (US); Charles Cummins, Seattle, WA (US); Robert F. Day, Bellevue, WA (US); Colin R. Anthony, Kirkland, WA (US); Jenny T. Lam, Seattle, WA (US); Isaac A. Sheldon, Seattle, WA (US); David G. De Vorchik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 554 days.

(21) Appl. No.: 11/186,827

(22) Filed: Jul. 22, 2005

(65) Prior Publication Data

US 2006/0020899 A1    Jan. 26, 2006

Related U.S. Application Data

(63) Continuation-in-part of application No. 10/831,145, filed on Apr. 26, 2004.

(51) Int. Cl.
*G06F 3/048* (2006.01)
(52) U.S. Cl. ........ 715/835; 715/763; 715/765; 715/838; 715/846
(58) Field of Classification Search .................. 715/744, 715/763, 765, 781, 835
See application file for complete search history.

(56) References Cited

U.S. PATENT DOCUMENTS

| | | | |
|---|---|---|---|
| 5,241,671 A | | 8/1993 | Reed et al. |
| 5,333,315 A | | 7/1994 | Saether et al. |
| 5,388,196 A | | 2/1995 | Pajak et al. |
| 5,428,736 A | * | 6/1995 | Kahl et al. .................... 715/839 |
| 5,461,710 A | * | 10/1995 | Bloomfield et al. .......... 715/839 |
| 5,499,364 A | | 3/1996 | Klein et al. |
| 5,504,852 A | | 4/1996 | Thompson-Rohrlich |
| 5,513,306 A | | 4/1996 | Mills et al. |
| 5,559,948 A | | 9/1996 | Bloomfield et al. |
| 5,572,647 A | | 11/1996 | Blades |

(Continued)

FOREIGN PATENT DOCUMENTS

CN        1421800        11/2001

(Continued)

OTHER PUBLICATIONS

Microsoft Windows XP Version 2002 (Screen Dumps, Figs. 1-16).

(Continued)

*Primary Examiner* — Alvin H Tan
(74) *Attorney, Agent, or Firm* — Shook Hardy & Bacon L.L.P.

(57) ABSTRACT

A method and system are provided for displaying icons in accordance with user preferences. The method includes providing a user with a size selection mechanism for selecting an icon size from a range of sizes. The method additionally includes searching a set of stored resources related to the underlying file and generating the icon in the selected size based upon the stored resources. The method may additionally include selecting an icon type including one of an image icon, a detail icon and a generic icon based on at least one of the user's size selection and the represented file. Furthermore, the icon display system of the invention positions labels and overlays in the vicinity of the icon based upon the selected size of the icon.

20 Claims, 10 Drawing Sheets

U.S. PATENT DOCUMENTS

| | | | | |
|---|---|---|---|---|
| 5,598,524 | A | 1/1997 | Johnston, Jr. et al. | |
| 5,630,042 | A | 5/1997 | McIntosh et al. | |
| 5,675,663 | A | 10/1997 | Koerner et al. | |
| 5,680,563 | A | 10/1997 | Edelman | |
| 5,684,969 | A * | 11/1997 | Ishida | 715/800 |
| 5,689,718 | A * | 11/1997 | Sakurai et al. | 715/205 |
| 5,696,486 | A | 12/1997 | Poliquin et al. | |
| 5,757,925 | A | 5/1998 | Faybishenko | |
| 5,771,380 | A * | 6/1998 | Tanaka et al. | 707/104.1 |
| 5,790,121 | A | 8/1998 | Sklar et al. | |
| 5,797,139 | A * | 8/1998 | Amro | 707/100 |
| 5,802,516 | A | 9/1998 | Shwarts et al. | |
| 5,831,606 | A | 11/1998 | Nakajima et al. | |
| 5,835,094 | A | 11/1998 | Ermel et al. | |
| 5,838,317 | A | 11/1998 | Bolnick et al. | |
| 5,838,322 | A | 11/1998 | Nakajima et al. | |
| 5,867,163 | A | 2/1999 | Kurtenbach | |
| 5,875,446 | A | 2/1999 | Brown et al. | |
| 5,878,410 | A | 3/1999 | Zbikowski et al. | |
| 5,899,995 | A | 5/1999 | Millier et al. | |
| 5,923,328 | A | 7/1999 | Griesmer | |
| 5,929,854 | A | 7/1999 | Ross | |
| 5,933,139 | A | 8/1999 | Feigner et al. | |
| 5,935,210 | A | 8/1999 | Stark | |
| 5,987,454 | A | 11/1999 | Hobbs | |
| 5,987,506 | A | 11/1999 | Carter et al. | |
| 6,003,040 | A | 12/1999 | Mital et al. | |
| 6,008,806 | A | 12/1999 | Nakajima et al. | |
| 6,014,137 | A | 1/2000 | Burns | |
| 6,021,262 | A | 2/2000 | Cote et al. | |
| 6,023,708 | A | 2/2000 | Mendez et al. | |
| 6,025,843 | A | 2/2000 | Sklar | |
| 6,037,944 | A | 3/2000 | Hugh | |
| 6,061,692 | A | 5/2000 | Thomas et al. | |
| 6,061,695 | A | 5/2000 | Slivka et al. | |
| 6,078,924 | A | 6/2000 | Ainsbury et al. | |
| 6,097,389 | A | 8/2000 | Morris et al. | |
| 6,144,968 | A | 11/2000 | Zellweger | |
| 6,147,601 | A | 11/2000 | Sandelman et al. | |
| 6,181,342 | B1 | 1/2001 | Niblack | |
| 6,202,061 | B1 | 3/2001 | Khosla et al. | |
| 6,237,011 | B1 | 5/2001 | Ferguson et al. | |
| 6,240,421 | B1 | 5/2001 | Stolarz | |
| 6,243,094 | B1 | 6/2001 | Sklar | |
| 6,243,724 | B1 * | 6/2001 | Mander et al. | 715/526 |
| 6,246,411 | B1 | 6/2001 | Strauss | |
| 6,256,031 | B1 | 7/2001 | Meijer et al. | |
| 6,275,829 | B1 | 8/2001 | Angiulo et al. | |
| 6,308,173 | B1 | 10/2001 | Glasser et al. | |
| 6,317,142 | B1 | 11/2001 | Decoste et al. | |
| 6,324,551 | B1 | 11/2001 | Lamping et al. | |
| 6,339,767 | B1 | 1/2002 | Rivette et al. | |
| 6,341,280 | B1 | 1/2002 | Glass et al. | |
| 6,363,377 | B1 | 3/2002 | Kravets et al. | |
| 6,363,400 | B1 | 3/2002 | Chtchetkine et al. | |
| 6,401,097 | B1 | 6/2002 | McCotter et al. | |
| 6,411,311 | B1 | 6/2002 | Rich et al. | |
| 6,430,575 | B1 | 8/2002 | Dourish et al. | |
| 6,437,807 | B1 | 8/2002 | Berquist et al. | |
| 6,448,985 | B1 | 9/2002 | McNally | |
| 6,453,311 | B1 | 9/2002 | Powers, III | |
| 6,453,319 | B1 | 9/2002 | Mattis et al. | |
| 6,456,305 | B1 * | 9/2002 | Qureshi et al. | 715/800 |
| 6,466,238 | B1 | 10/2002 | Berry et al. | |
| 6,466,932 | B1 | 10/2002 | Dennis et al. | |
| 6,480,835 | B1 | 11/2002 | Light | |
| 6,501,487 | B1 * | 12/2002 | Taguchi | 715/788 |
| 6,505,233 | B1 | 1/2003 | Hanson et al. | |
| 6,513,038 | B1 | 1/2003 | Hasegawa et al. | |
| 6,526,399 | B1 | 2/2003 | Coulson et al. | |
| 6,535,229 | B1 | 3/2003 | Kraft | |
| 6,535,230 | B1 | 3/2003 | Celik | |
| 6,539,399 | B1 | 3/2003 | Hazama et al. | |
| 6,549,217 | B1 | 4/2003 | De Greef et al. | |
| 6,549,916 | B1 | 4/2003 | Sedlar | |
| 6,563,514 | B1 | 5/2003 | Samar | |
| 6,573,906 | B1 | 6/2003 | Harding et al. | |
| 6,573,907 | B1 | 6/2003 | Madrane | |
| 6,583,799 | B1 | 6/2003 | Manolis et al. | |
| 6,590,585 | B1 | 7/2003 | Suzuki et al. | |
| 6,606,105 | B1 | 8/2003 | Quartetti | |
| 6,613,101 | B2 | 9/2003 | Mander et al. | |
| 6,628,309 | B1 | 9/2003 | Dodson et al. | |
| 6,636,238 | B1 | 10/2003 | Amir et al. | |
| 6,636,250 | B1 | 10/2003 | Gasser | |
| 6,662,198 | B2 | 12/2003 | Satyanarayanan et al. | |
| 6,684,222 | B1 | 1/2004 | Cornelius et al. | |
| 6,735,623 | B1 | 5/2004 | Prust | |
| 6,738,770 | B2 | 5/2004 | Gorman | |
| 6,745,206 | B2 | 6/2004 | Mandler et al. | |
| 6,750,888 | B1 * | 6/2004 | Nakagawa | 715/800 |
| 6,754,829 | B1 | 6/2004 | Butt et al. | |
| 6,762,776 | B2 | 7/2004 | Huapaya | |
| 6,762,777 | B2 | 7/2004 | Carroll | |
| 6,763,458 | B1 | 7/2004 | Watanabe et al. | |
| 6,768,999 | B2 | 7/2004 | Prager et al. | |
| 6,784,900 | B1 | 8/2004 | Dobronsky et al. | |
| 6,795,094 | B1 | 9/2004 | Watanabe et al. | |
| 6,801,919 | B2 | 10/2004 | Hunt et al. | |
| 6,803,926 | B1 | 10/2004 | Lamb et al. | |
| 6,816,863 | B2 | 11/2004 | Bates et al. | |
| 6,823,344 | B1 | 11/2004 | Isensee et al. | |
| 6,847,959 | B1 | 1/2005 | Arrouye et al. | |
| 6,853,391 | B2 | 2/2005 | Bates et al. | |
| 6,865,568 | B2 | 3/2005 | Chau | |
| 6,871,348 | B1 | 3/2005 | Cooper | |
| 6,876,996 | B2 | 4/2005 | Czajkowski et al. | |
| 6,880,132 | B2 | 4/2005 | Uemura | |
| 6,883,009 | B2 | 4/2005 | Yoo | |
| 6,883,146 | B2 | 4/2005 | Prabhu et al. | |
| 6,906,722 | B2 | 6/2005 | Hrebejk et al. | |
| 6,922,709 | B2 | 7/2005 | Goodman | |
| 6,938,207 | B1 | 8/2005 | Haynes | |
| 6,938,215 | B2 | 8/2005 | Kobayashi et al. | |
| 6,944,647 | B2 | 9/2005 | Shah et al. | |
| 6,947,959 | B1 | 9/2005 | Gill | |
| 6,950,818 | B2 | 9/2005 | Dennis et al. | |
| 6,952,724 | B2 | 10/2005 | Prust | |
| 6,980,993 | B2 | 12/2005 | Horvitz et al. | |
| 6,983,424 | B1 * | 1/2006 | Dutta | 715/800 |
| 7,010,755 | B2 | 3/2006 | Anderson et al. | |
| 7,051,291 | B2 * | 5/2006 | Sciammarella et al. | 715/838 |
| 7,068,291 | B1 | 6/2006 | Roberts et al. | |
| 7,139,811 | B2 | 11/2006 | Lev Ran et al. | |
| 7,203,948 | B2 | 4/2007 | Mukundan et al. | |
| 7,216,304 | B1 * | 5/2007 | Gourdol et al. | 715/835 |
| 7,275,063 | B2 * | 9/2007 | Horn | 707/102 |
| 7,283,845 | B2 * | 10/2007 | De Bast | 455/566 |
| 2001/0034771 | A1 | 10/2001 | Hutsch et al. | |
| 2001/0047368 | A1 | 11/2001 | Oshinsky et al. | |
| 2001/0049675 | A1 | 12/2001 | Mandler et al. | |
| 2001/0053996 | A1 | 12/2001 | Atkinson | |
| 2001/0056434 | A1 | 12/2001 | Kaplan et al. | |
| 2001/0056508 | A1 | 12/2001 | Arneson et al. | |
| 2002/0000998 | A1 * | 1/2002 | Scott et al. | 345/667 |
| 2002/0019935 | A1 | 2/2002 | Andrew et al. | |
| 2002/0033844 | A1 | 3/2002 | Levy et al. | |
| 2002/0046232 | A1 | 4/2002 | Adams et al. | |
| 2002/0046299 | A1 | 4/2002 | Lefeber et al. | |
| 2002/0049717 | A1 | 4/2002 | Routtenberg et al. | |
| 2002/0052885 | A1 | 5/2002 | Levy | |
| 2002/0054167 | A1 | 5/2002 | Hugh | |
| 2002/0059199 | A1 | 5/2002 | Harvey | |
| 2002/0062310 | A1 | 5/2002 | Marmor et al. | |
| 2002/0075310 | A1 | 6/2002 | Prabhu et al. | |
| 2002/0075312 | A1 | 6/2002 | Amadio et al. | |
| 2002/0075330 | A1 | 6/2002 | Rosenzweig et al. | |
| 2002/0087740 | A1 | 7/2002 | Castanho et al. | |
| 2002/0087969 | A1 | 7/2002 | Brunheroto et al. | |
| 2002/0089540 | A1 | 7/2002 | Geier et al. | |
| 2002/0091679 | A1 | 7/2002 | Wright | |
| 2002/0091697 | A1 | 7/2002 | Huang et al. | |
| 2002/0091739 | A1 | 7/2002 | Ferlitsch et al. | |
| 2002/0095416 | A1 | 7/2002 | Schwols | |
| 2002/0097278 | A1 | 7/2002 | Mandler et al. | |
| 2002/0103998 | A1 | 8/2002 | DeBruine | |
| 2002/0104069 | A1 | 8/2002 | Gouge et al. | |

| | | |
|---|---|---|
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0152262 A1 | 10/2002 | Arkin et al. |
| 2002/0152267 A1 | 10/2002 | Lennon |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0184357 A1 | 12/2002 | Traversat et al. |
| 2002/0188605 A1 | 12/2002 | Adya et al. |
| 2002/0188735 A1 | 12/2002 | Needham et al. |
| 2002/0194252 A1 | 12/2002 | Powers, III |
| 2002/0196276 A1 | 12/2002 | Corl et al. |
| 2002/0199061 A1 | 12/2002 | Friedman et al. |
| 2003/0009484 A1 | 1/2003 | Hamanaka et al. |
| 2003/0014415 A1 | 1/2003 | Weiss et al. |
| 2003/0018657 A1 | 1/2003 | Monday |
| 2003/0018712 A1 | 1/2003 | Harrow et al. |
| 2003/0028610 A1 | 2/2003 | Pearson |
| 2003/0041178 A1 | 2/2003 | Brouk et al. |
| 2003/0046260 A1 | 3/2003 | Satyanarayanan et al. |
| 2003/0052927 A1 | 3/2003 | Barksdale et al. |
| 2003/0069893 A1 | 4/2003 | Kanai et al. |
| 2003/0069908 A1 | 4/2003 | Anthony et al. |
| 2003/0074356 A1 | 4/2003 | Kaier et al. |
| 2003/0078918 A1 | 4/2003 | Souvignier et al. |
| 2003/0093321 A1 | 5/2003 | Bodmer et al. |
| 2003/0093531 A1 | 5/2003 | Yeung et al. |
| 2003/0093580 A1 | 5/2003 | Thomas et al. |
| 2003/0101200 A1 | 5/2003 | Koyama et al. |
| 2003/0105745 A1 | 6/2003 | Davidson et al. |
| 2003/0110188 A1 | 6/2003 | Howard et al. |
| 2003/0115218 A1 | 6/2003 | Bobbitt et al. |
| 2003/0117403 A1 | 6/2003 | Park et al. |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Omoigui |
| 2003/0126212 A1 | 7/2003 | Morris et al. |
| 2003/0135495 A1 | 7/2003 | Vagnozzi |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki et al. |
| 2003/0158855 A1 | 8/2003 | Farnham et al. |
| 2003/0177422 A1 | 9/2003 | Taroukhine et al. |
| 2003/0184587 A1 | 10/2003 | Ording et al. |
| 2003/0210281 A1 | 11/2003 | Ellis et al. |
| 2003/0212680 A1 | 11/2003 | Bates et al. |
| 2003/0212710 A1 | 11/2003 | Guy |
| 2003/0222915 A1 | 12/2003 | Marion et al. |
| 2003/0225796 A1 | 12/2003 | Matsubara |
| 2003/0227487 A1 | 12/2003 | Hugh |
| 2003/0233419 A1 | 12/2003 | Beringer |
| 2004/0001106 A1 | 1/2004 | Deutscher et al. |
| 2004/0002993 A1 | 1/2004 | Toussaint et al. |
| 2004/0003247 A1 | 1/2004 | Fraser et al. |
| 2004/0008226 A1 | 1/2004 | Manolis et al. |
| 2004/0012601 A1 * | 1/2004 | Sang et al. .................... 345/581 |
| 2004/0019584 A1 | 1/2004 | Greening et al. |
| 2004/0019655 A1 | 1/2004 | Uemura et al. |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0056896 A1 | 3/2004 | Doblmayr et al. |
| 2004/0068524 A1 | 4/2004 | Aboulhosn et al. |
| 2004/0070612 A1 | 4/2004 | Sinclair et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0090470 A1 * | 5/2004 | Kim et al. .................... 345/846 |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103280 A1 | 5/2004 | Balfanz et al. |
| 2004/0117358 A1 | 6/2004 | Von Kaenel et al. |
| 2004/0133572 A1 | 7/2004 | Bailey et al. |
| 2004/0133588 A1 | 7/2004 | Kiessig et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1 | 8/2004 | Oshinsky et al. |
| 2004/0177116 A1 | 9/2004 | McConn et al. |
| 2004/0177148 A1 | 9/2004 | Tsimelzon, Jr. |
| 2004/0177319 A1 | 9/2004 | Horn |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193594 A1 | 9/2004 | Moore et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0205698 A1 | 10/2004 | Schliesmann et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0249902 A1 | 12/2004 | Tadayon et al. |
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0080807 A1 | 4/2005 | Beilinson et al. |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |
| 2005/0149481 A1 | 7/2005 | Hesselink et al. |
| 2005/0166159 A1 | 7/2005 | Mondry et al. |
| 2005/0171947 A1 | 8/2005 | Gautestad |
| 2005/0192953 A1 | 9/2005 | Neale et al. |
| 2005/0192966 A1 | 9/2005 | Hilbert et al. |
| 2005/0243993 A1 | 11/2005 | McKinzie et al. |
| 2005/0246331 A1 | 11/2005 | De Vorchik et al. |
| 2005/0246643 A1 | 11/2005 | Gusmorino et al. |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0080308 A1 | 4/2006 | Carpentier et al. |
| 2006/0129627 A1 | 6/2006 | Phillips et al. |
| 2006/0173873 A1 | 8/2006 | Prompt et al. |
| 2006/0200466 A1 | 9/2006 | Kaasten et al. |
| 2006/0200832 A1 | 9/2006 | Dutton |
| 2006/0218122 A1 | 9/2006 | Poston et al. |
| 2008/0228714 A1 | 9/2008 | Prager et al. |

FOREIGN PATENT DOCUMENTS

| | | |
|---|---|---|
| GB | 2329492 A | 7/1998 |
| WO | 9938092 | 7/1999 |

| | | |
|---|---|---|
| WO | 01/63919 A1 | 8/2001 |
| WO | WO 0225420 | 3/2002 |
| WO | WO 2004107151 | 9/2004 |

OTHER PUBLICATIONS

Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.
Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Cohen, et al., "A Case for Associative Peer to Peer Overlays"—ACM SIGCOMM Computer Communications Review, vol. 33, No. 1, Jan. 2003, pp. 95-100.
Lui, et al., "Interoperability of Peer-to-Peer File Sharing Protocols"—ACM SIGecom Exchanges, vol. 3, No. 3, Aug. 2002, pp. 25-33.
Written Opinion of Singapore Application No. 200403220-7 dated May 18, 2006.
McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
Langer, Maria, Mac OS X: Visual QuickStart Guide; Apr. 2001, Peachpit Press, Mac OS X Disk Organization (pp. 1-3), Views (pp. 1-11), Outlines (1-3).
Ray, Jay, Mac OS X Unleashed, Nov. 2001, Sams, Chapter 4. The Finder: Working with Files and Applications (pp. 1-15), Getting File Information (pp. 1-7).
International Search Report and Written Opinion of PCT/US04/25931 dated Apr. 3, 2007.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Out", Microsoft Press, 2001, Chapter 11, 39 pages.
European Search Report for 03007909.9-2211 dated Jun. 30, 2006.
D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.
Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.
Australian Search Report for SG 200301764-7 dated Mar. 30, 2006.
D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.
Australian Written Opinion for SG 200301764-7 dated Mar. 30, 2006.
Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.
Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.
Microsoft Press Pass, "Windows XP is Here!", New York, Oct. 25, 2001.
McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.
Stanek R. William, "Microsoft Windows XP Professional Administratior's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
Lee, J., "An End-User Perspective on File-Sharing Systems," Communications of the ACM 46(2):49-53, Feb. 2003.
Ohtani, A., et al., "A File Sharing Method for Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualFS: A New Journaling File System Without Meta-Data Duplication," Conference Proceedings of the 2002 International Conference on Supercomputing, New York, Jun. 22-26, 2002, p. 137-146.
Manber, U., and S. Wu, "Glimpse: A Tool to Search Through Entire File Systems," Proceedings of USENIX Winter 1994 Conference, San Francisco, CA, Jan. 17-21. 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.
Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desai, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

A.T. McCray, et al., Extending the role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

"Trillian/Trillian Pro IM Clients" Products Description, © 1999-2004 Cerulean Studios, <http://www.ceruleanstudios.com> [retrieved Apr. 30, 2004].

International Search Report of WO2004/097638 A1 (McKee, et al.) dated Nov. 11, 2004.

Bott, et al., Book titled "Special Edition Using Windows 98, Second Edition", Dec. 21, 1999, second edition, pp. 1-7.

Supplementary European Search Report for EP 04780390 dated Jun. 18, 2007.

International Search Report and Written Opinion of PCT/US06/26859 dated Jul. 25, 2008.

International Search Report with Written Opinion dated Jul. 25, 2008.

Office Action dated Apr. 18, 2007 for U.S. Appl. No. 10/831,145, filed Apr. 26, 2004.

Office Action dated Oct. 5, 2007 for U.S. Appl. No. 10/831,145, filed Apr. 26, 2004 .

Office Action dated Jul. 25, 2008 for U.S. Appl. No. 10/831,145, filed Apr. 26, 2004 .

Office Action dated Jan. 15, 2009 for U.S. Appl. No. 10/831,145, filed Apr. 26, 2004.

Office Action dated Jun. 23, 2009 for U.S. Appl. No. 10/831,145, filed Apr. 26, 2004.

Office Action in U.S. Appl. No. 10/831,145 mailed Mar. 30, 2010, 15 pages.

Office Action mailed Jan. 3, 2011 in U.S. Appl. No. 10/831,145.

\* cited by examiner

SCALING ICONS FOR REPRESENTING FILES

CROSS-REFERENCE TO RELATED APPLICATIONS

This application is a continuation-in-part of copending U.S. patent application Ser. No. 10/831,145, filed Apr. 26, 2004, and entitled "System and Method for Scaling Icons."

BACKGROUND

Icons have been used for many years in computer systems to display information to users. Icons are images that are used to represent items such as files, folders, shortcuts, applications, documents, tasks, and commands throughout a computer operating system such as MICROSOFT WINDOWS™, a product of the Microsoft Corporation of Redmond, Wash. Icons are currently used in toolbars, dialog boxes, menus, and numerous other locations in file management systems such as Windows Explorer, also a product of the Microsoft Corporation. Icons are usually stored as static bitmaps, but dynamic icon handlers may also be written to generate icons dynamically.

Currently, two types of icons are used to represent items. These two types include traditional icons and thumbnail icons. Whereas traditional icons are typically shared across files and are determined per type, thumbnails are determined per item and are not shared across files. A traditional icon is composed of two components including an icon image and a status overlay. The icon image forms the basis of the traditional icon. The status overlay is used to convey status information about the item. It is used, for example, to display the shortcut overlay.

A thumbnail icon is a particular type of icon displaying an image generated based on the contents of the underlying item. For example, an icon for an image file that actually looks like the image itself is a thumbnail of the image file. Thumbnail icons may also include an overlay. Thumbnail icons may be dynamically generated by code run on a user computer, although the generated image may be cached.

Although existing operating systems offer thumbnails, these thumbnails are not well integrated into existing file management systems such as Windows Explorer. As a result, the thumbnail feature is not as useful as it could be. A user has to go to a special "thumbnails view" to see thumbnail icons today, even for objects having thumbnail icons that would be visually effective at a smaller size, such as photographs. When in the thumbnails view of existing systems, icons for objects without thumbnails appear small and inadequate. The user typically cannot see extra information about each file in thumbnails view as the user can in other views such as tile view or details view. Accordingly, the user is often forced to choose between viewing thumbnails and viewing other important information.

Because the thumbnails feature is remote and not extensively utilized, little incentive exists for Independent Software Vendors (ISVs) to write thumbnail generators, When ISVs do write the thumbnail generators, they are unlikely to invest in making the thumbnail generators powerful. As a result, many existing application produce thumbnails of poor quality. Generally, since thumbnails are pictures, it is difficult to determine what type of item underlies a thumbnail icon. Furthermore, while traditional icons appear instantly, thumbnail icons are typically noticeably slow to appear because they were not generated in advance.

With traditional icons, overlays are often used as a primary or only indication of information about an item underlying an icon. However, overlays do not reliably appear. If multiple states need to be shown, overlays will only show the highest priority state and will ignore others since no more than one overlay may be shown at a time. Overlays are difficult to recognize at small icon sizes, such as the sizes generally used in list or details mode. Overlays have additional drawbacks including the ability to be readily imitated and used in an unauthorized manner. A further limitation is the inaccessibility of overlays to the visually-impaired. A user navigating with the keyboard and using a narrator hears a name and type of each file as the file is selected, but is not given any information about a state that the overlay represents. Additionally, overlays are used inconsistently to convey information about the state of a file.

BRIEF SUMMARY

Features described herein are directed to a method for displaying an icon representing an underlying file on a user interface. The method may include providing a user with a size selection mechanism for selecting an icon size from a range of sizes. The method may further include searching a set of stored resources related to the underlying file and generating the icon in a user selected size based upon the stored resources.

In another aspect, a method is provided for enhancing display of icons on a user interface. The method may provide a user selection component for allowing a user to select an icon size for an icon representing a file. The method may additionally include selecting an icon type including one of a traditional icon and a thumbnail icon based on at least one of the size selection and the represented file. The method may additionally include generating the selected icon having the selected size and icon type.

In yet an additional aspect, a system is provided for enhancing icon display. The system may include a user icon scaling module for allowing a user to select an icon size for an icon representing an underlying file. The system may additionally include a resource selection module for selecting an image resource for generating the icon based on the size selection. The resource selection module may, in some aspects, proceed through three levels of potential icons: one having an image representing the contents of the displayed object, one having an image that displays details of the current object, and one having a generic image common to multiple objects.

In yet a further aspect, a system is provided for enhancing icon display. The system may include a user icon scaling module for allowing a user to select an icon size for an icon representing an underlying file. The system may additionally include a type selection module for selecting a type of icon including at least one of a traditional icon and a thumbnail icon, the type selection based on at least one of the size selection and the underlying file.

BRIEF DESCRIPTION OF THE DRAWINGS

The features described in detail below are described with reference to the attached drawings figures, wherein:

FIGS. 6A-6C illustrate multiple embodiments of visual effects for icons;

DETAILED DESCRIPTION

I. System Overview

Features described herein include a method and system for enabling scaling of icons to enhance a user experience. Icon scaling enables users to resize the icons in file management systems, such as Microsoft Windows Explorer, to any size in a range from a small size appropriate for looking at a long list of items to a very large size appropriate for looking at a small number of thumbnails within a single view. As an icon is resized, the appearance and layout of the icon may change to best accommodate its new size.

Figure 1:
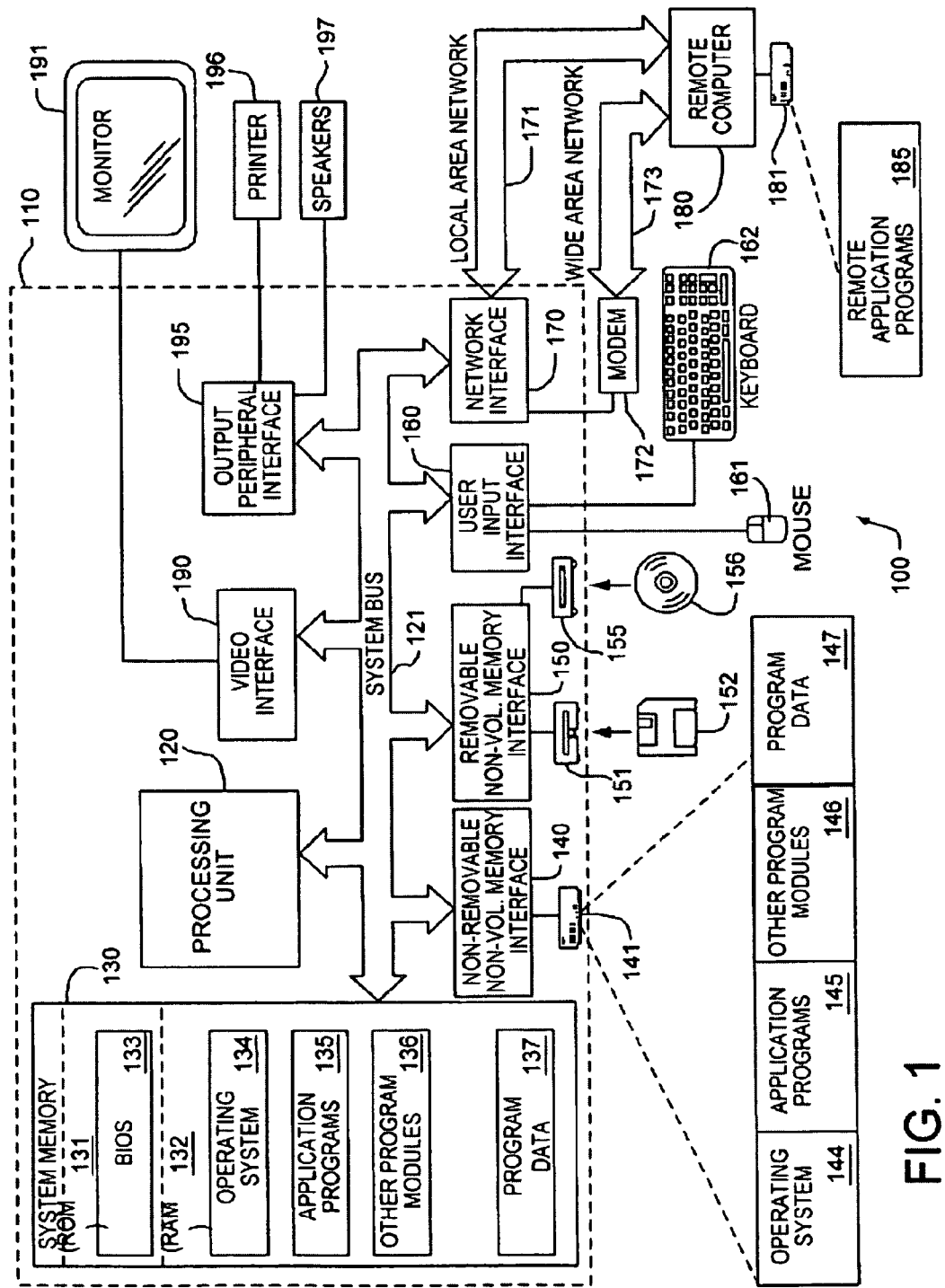
FIG. 1 is a block diagram illustrating a computerized environment in which features described herein may be implemented.
Figure 2:
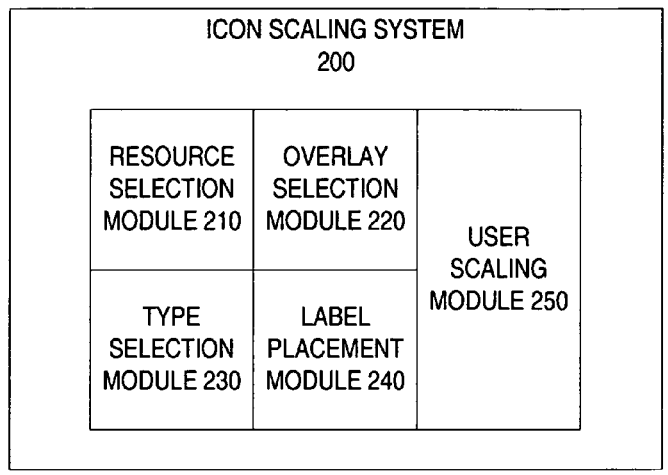
FIG. 2 is a block diagram illustrating an icon scaling system in accordance with several features described herein.

FIG. 2 illustrates an icon scaling module 200. The icon scaling module 200 may be implemented as one or more program modules in a computerized environment as described below with reference to FIG. 1. The icon scaling module 200 may include a resource selection module 210, an overlay selection module 220, a type selection module 230, a label placement module 240, and a user scaling module 250. Through the user scaling module 250, a user is able to select an icon size. Based on the user scaling selection, the type selection module 230 may select a type of icon such as a thumbnail or traditional icon. The resource selection module 210 may also select a particular image resource for scaling based on the scaling selection. Similarly, in some aspects, the overlay selection module 220 may select, scale, and/or position a status overlay and/or a type overlay based on the scaling selection, and the label placement module 240 may determine an appropriate location for a label associated with the icon based on the scaling selection.

Icons may be authored using a predetermined set of sizes, such as 16×16 pixels and 32×32 pixels. When a user chooses to view an icon at a size that is not one of the predetermined sizes, the scaling module 200 may interpolate to determine what image to show the user. When the size of an icon is changed, variables including the type of icon, the image resource, label placement, and/or overlay configuration may be affected as set forth herein.

II. Exemplary Operating Environment

FIG. 1 illustrates an example of a suitable computing system environment 100 on which the features described herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. The features may be practiced with other computer system configurations, including hand-held devices, multiprocessor systems, microprocessor-based or programmable consumer electronics, minicomputers, mainframe computers, and the like. The features may also be practiced in distributed computing environments, where tasks may be performed by remote processing devices that are linked through a communications network. In a distributed computing environment, program modules may be located in both local and remote computer storage media including memory storage devices.

With reference to FIG. 1, the exemplary system 100 may include a general purpose-computing device in the form of a computer 110, which may include a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices may be connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known.

III. Sample Icons

Figure 3A:
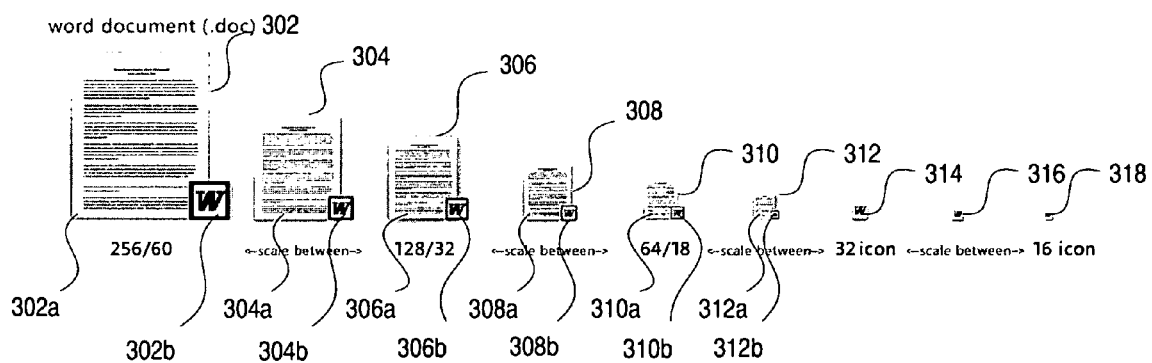
FIGS. 3A-3G are samples or different types and sizes of icons.

FIGS. 3A-3G illustrate a sampling of icons in various sizes. FIG. 3A illustrates a sampling of document icons 302, 304, 306, 308, 310, 312, 314, 316, and 318. The document icons 302, 304, 306, 308, 310, and 312 each include respective document images 302a, 304a, 306a, 308a, 310a, and 312a. Each of the aforementioned document icons additionally includes a type overlay 302b, 304b, 306b, 308b, 310b, and 312b. These type overlays indicate a type of the underlying document (e.g., word processing file, picture file, video file, audio file, spreadsheet, etc.). The document icon 302 is shown as having a 256×256 pixel overall icon size and a 60×60 pixel type overlay portion. The images and overlays may be scaled independently of one another, such that the image 304a is scaled between the images 302a and 306a and the overlay 304b is scaled between the overlays 302b and 306b. In the depicted example, document icon 306 is the next available document size. The overall size of icon 306 is 128×128 pixels and the overlay portion is 32×32 pixels. Document icon 304 is an icon scaled between the standard sized icons 302 and 306. Similarly, document icon 308 is scaled between the document icon 306 and the document icon 310, which includes a 64×64 overall icon size and an 18×18 pixel overlay portion 310b. Document icon 314 is a 32×32 pixel icon that includes only an overlay portion because its size is too small to clearly display both an overlay and a document image. Document icon 312, which is scaled between document icon 310 and 314 show both the document image portion 312a and the type overlay portion 312b. Smaller icons 314, 316 and 318 show only the type overlay portion of the item. The respective type overlays may include an icon, image, symbol, letter, number, etc. to indicate the type of document such as a MICROSOFT WORD™ document. The document icons may be provided in many sizes, including 16×16, 24×24, 32×32, 48×48, 128×128, and 256×256 pixels. Alternatively, some of these sizes may be omitted and/or additional sizes may be included.

Figure 3B:
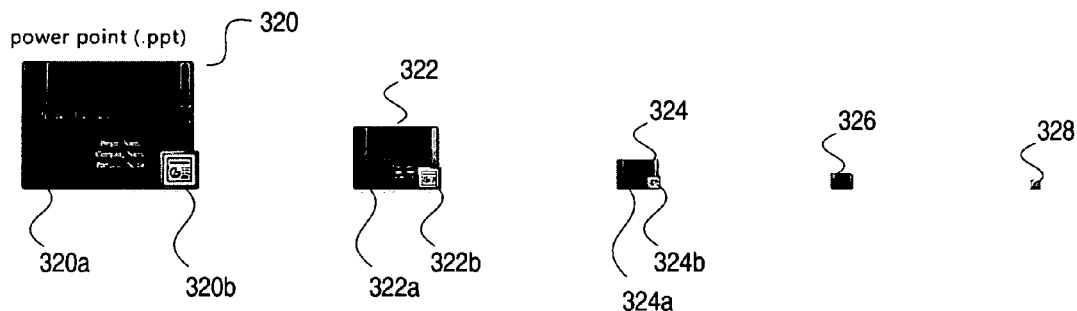

FIG. 3B illustrates a set of MICROSOFT POWERPOINT™ Icons 320, 322, 324, 326, and 328. The Icons 320, 322, and 324 include an image portion 320a, 322a, and 324a, which may be an image of the first slide in a presentation. The icons 320, 322, and 324 also include overlay portions 320b, 322b, and 324b. The icons 326 and 328 are too small to be displayed with both portions. Accordingly these icons include only a thumbnail image. The decision to show a thumbnail image or an overlay may be made on a per type basis.

Figure 3C:
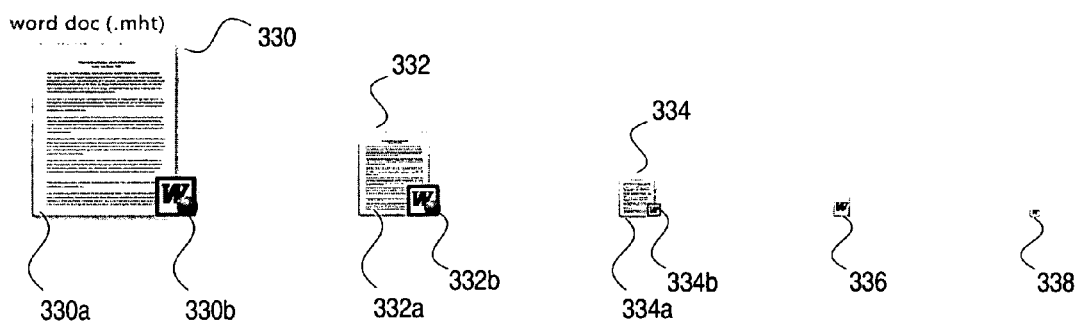

FIG. 3C also includes a set of icons 330, 332, 334, 336, and 338. The icons 330, 332, and 334 include respective image portions 330a, 332a, and 334a, which may be an image of a first page of a document, and overlay portions 330b, 332b, and 334b indicating that the document is an .mht document. Icons 336 and 338 are too small to adequately display both portions, and therefore include only the type overlay portion to indicate the type of underlying document.

Figure 3D:

FIG. 3D illustrates a plurality of scaled photo icons 340, 342, 344, 346, and 348. These icons are preferably thumbnail icons that include a photograph or image from within the underlying file. The thumbnail icons shown display useful information and include no overlay portion.

Figure 3E:
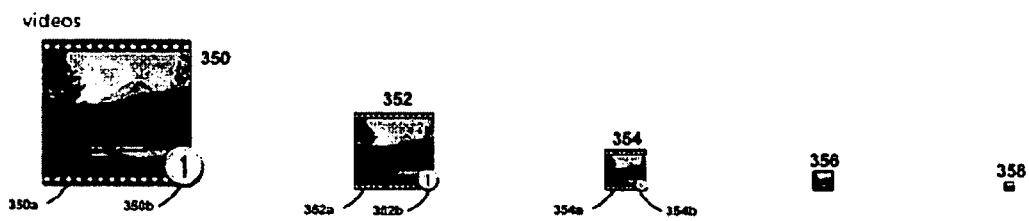

FIG. 3E illustrates a set of video icons 350, 352, 354, 356, and 358. The icons 350, 352, and 354 each include a respective image portion 350a, 352a, and 354a. The included images may be thumbnail images, such as a still image or portion thereof of a video. The icons 350, 352, and 354 each also include a respective type overlay portion 350b, 352b, and 354b. The icons 356 and 358 include only the image portion, which may be a thumbnail image, as the icons are too small to include both portions.

Figure 3F:
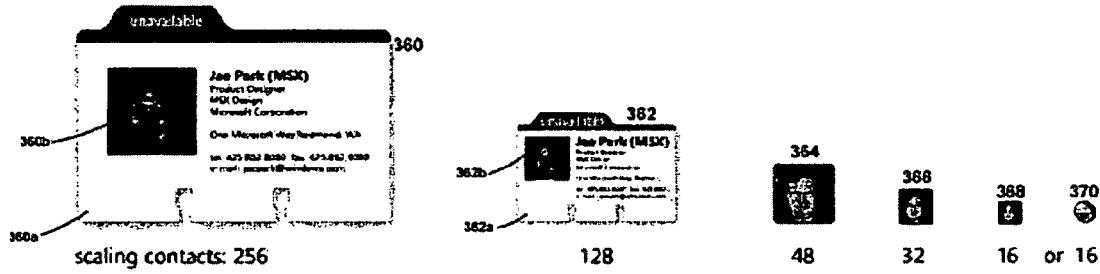

FIG. 3F illustrates a set of contact icons 360, 362, 364, 366, 368, and 370, which may be used in conjunction with an email and/or address book. The icons 360 and 362 each include a respective image portion 360b and 362b, which may be a thumbnail image, and a respective informational portion 360a and 362a. Icons 364, 366, and 368 include only an image portion, as the icons are too small to show both the image and informational portion. Icon 370 illustrates a generic image that may be shown if a thumbnail image is unavailable.

Figure 3G:
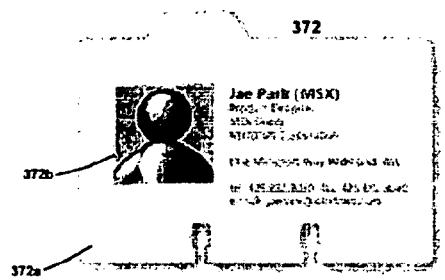

FIG. 3G illustrates a generic contact icon 372 that may be used when no photograph is available for the contact. The icon 372 includes a generic image 372b and an informational portion 372a.

As illustrated by these examples, scaled icons may differ in terms of their relative size. The scaling may be done beforehand, in which case multiple versions of the icon, at different scales, may be generated in advance and stored in a system memory. Scaling may also be performed dynamically, in which a new scale version of an icon is generated at the time it is needed. The different scale versions of icons may differ in other respects as well. For example, larger scale icons may have more graphical space available for additional elements, such as additional overlays, user interface elements, more detailed images, etc., and may be more complex than the smaller scale versions by including those additional features. Conversely, a smaller scale icon might omit some of these features, and may be simpler by comparison.

IV. Overlays

As set forth above, the different icon sizes may also include different overlay sizes. As set forth above with respect to FIG. 2, the selection and placement of overlays may be based on user-selected scaling. The overlay selection module 220 determines an overlay configuration based on user scaling input.

Two kinds of overlays include status overlays and type overlays. The overlays shown above with respect to FIGS. 3A-G are type overlays that indicate a type. The type overlay may be used for thumbnail icons to convey what type of object the thumbnail image portrays. The type overlays appear in a lower right-hand corner of the image. Status overlays serve as a visual cue to help a user quickly identify some piece of relevant information about an item being viewed. Status overlays may appear in a lower left hand corner of an image.

One use of a status overlay includes alerting the user of a transitional or temporary state of a file upon which a user may wish to act. An example would be putting a "new" overlay on a file that has just recently been created. Another possible use for a status overlay is indicating relevant context sensitive information upon which a user may wish to act. An example would be putting an "error" overlay on a file in the download manager that could not complete downloading. In general, information that is being conveyed through a status overlay should also be a property that can be used for any purpose by the user, such as sorting, grouping, stacking, filtering, and searching. The information can also help the user make an informed decision as to what they want to/can do with a file. For example, an overlay might indicate that the file was downloaded from the Internet and has not been checked for viruses. Such an overlay would help the user decide whether to open the file, or whether to first run a virus scan on it. As another example, an overlay might indicate whether the associated file is available locally or if it is available remotely (such as from an Internet site). A file that is not available locally might take longer to open, and the user might factor that in the decision as to whether to open the file.

Table 1 describes size overlays that may be displayed on icons of different sizes.

TABLE 1

| Icon Size | Corresponding Overlay Size |
|---|---|
| 256 × 256 | 48 × 48 |
| 128 × 128 | 32 × 32 |
| 48 × 48 | 24 × 24 |
| 32 × 32 | 16 × 16 |
| 16 × 16 | 8 × 8 |

Figure 11:
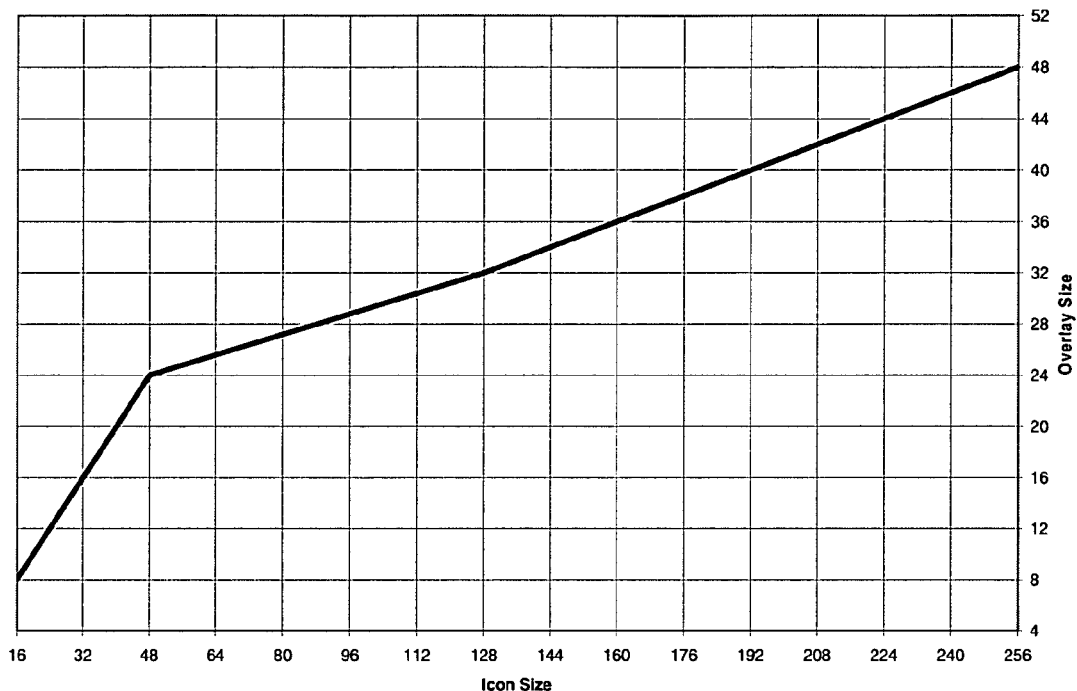
FIG. 11 is a table showing example icon size relationships.

The overlays may scale independently from the icons. Between each defined icon snap size such as 256×256, 128×128, 64×64, 32×32, and 16×16, the overlays may scale linearly between the two overlay sizes. Table 2, shown in FIG. 11, shows one embodiment of the overlay sizes relative to icon sizes along a continuous range.

V. Icon Types and Layouts

Figures 4, 5:
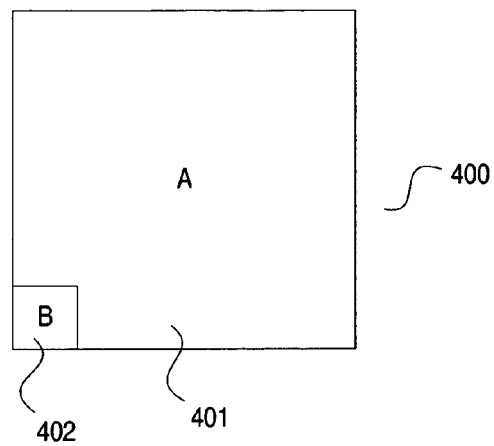
FIG. 4 is a block diagram illustrating an icon configuration.
FIG. 5 illustrates several thumbnail icon configurations.

FIG. 4 illustrates a traditional icon 400 including an icon image 401 and a status overlay 402. The icon image 401 may be stored as a bitmap or may be dynamically generated. The status overlay 402 is used to convey status information about an item. The status overlay may also be dynamically generated or may be stored as a bitmap. In the displayed embodiment, the icon image 401 has dimensions of width=height=X. In some aspects, the status overlay 402 is drawn at the bottom left corner of the image so that the bottom edge of the overlay 402 is aligned with the bottom edge of the icon 400 and the left edge of the overlay 402 is aligned with the left edge of the icon 400. Alternatively, the layout may be configured differently.

FIG. 5 illustrates possible layouts for a thumbnail icon. A row 500 illustrates bottom aligned thumbnail icons 510 and 520. A row 530 illustrates centrally aligned thumbnail icons 540 and 550. The bottom-aligned thumbnail icon 510 includes an image portion 512, a status overlay 514, and a type overlay 516. The bottom-aligned thumbnail icon 520 includes an image portion 522, status overlay 524, and a type overlay 526. The thumbnail icon 540 includes an image portion 542, a status overlay 544, and a type overlay 546. The thumbnail icon 550 includes an image portion 552, a status overlay 554, and a type overlay 556. In general, the image within each icon is denoted by (A), the status overlay by (B), and the type overlay by (C). The thumbnail icon itself is a square with a width and height equal to X. The thumbnail image (A) is scaled so that its longest dimension is at most equal to X.

As illustrated in FIG. 5, in all of the displayed configurations, the thumbnail image (A) is drawn horizontally centered within the thumbnail icon. The vertical placement of the thumbnail image (A) may be determined by the type of view. If a current view has text labels placed below the icon then the bottom edge of the thumbnail image (A) may lie along the bottom edge of the thumbnail icon. If the current view has text labels placed to the side of the icon, then the thumbnail image (A) may be vertically centered within the thumbnail icon.

The placement of the status overlay (B) may depend on the placement of the thumbnail image (A) within the thumbnail icon. The depicted status overlay (B) fits within the boundaries of the thumbnail icon. Horizontally, the status overlay (B) may be centered around the left edge of the thumbnail image (A), but may be moved to the right when necessary, to avoid extending over a left boundary of the thumbnail icon itself.

The placement of the type overlay (C) may depend on the placement of the thumbnail image (A) within the thumbnail icon. Vertically, like the status overlay (B), the bottom edge of the type overlay (C) may lie along the bottom edge of the thumbnail image such that the type overlay (C) fits within the boundaries of the thumbnail icon when the thumbnail image (A) is bottom-aligned. Horizontally, like a mirror of the status overlay (B), the type overlay (C) may be centered around the right edge of the thumbnail image (A), but may be moved to the left when necessary, to avoid extending over the right boundary of the thumbnail icon itself.

For certain predefined icon sizes, such as icons between 16×16 and 47×47 pixels, the label placement module 240 may position the filename beside the icon. For example, for sizes 32×32 to 47, the label placement module 240 may provide additional tile information beside the icon. For sizes 48×48 and larger, the label placement module 240 may place the filename below the icon.

In a default mode, type overlays may be shown on a thumbnail icon if and only if it is within the document library. In some instances, type overlays will not be shown on photographs or video by default. A setting in the view options may be available to enable users to turn on or off the type overlays on documents. A mechanism such as an application program interface (API) may be provided that allows applications to associate a type overlay with each file type they own.

VI. Visual Enhancements

Figure 6C:
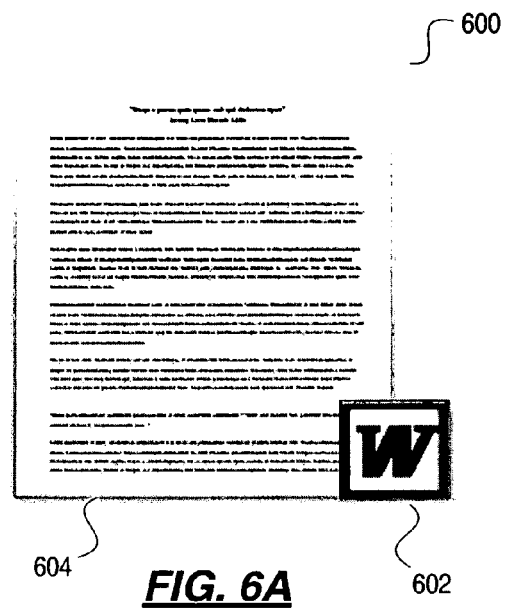
Figure 6C:
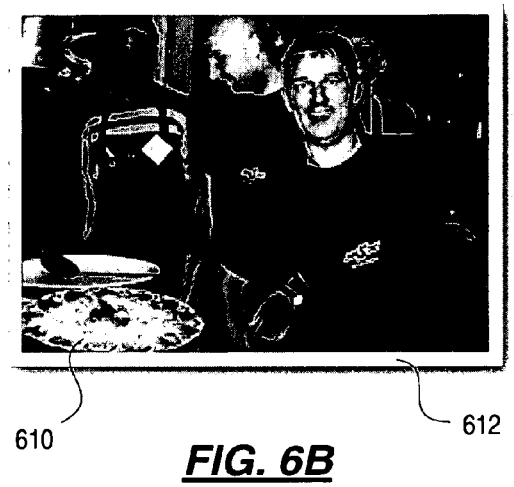
Figure 6C:

FIGS. 6A-6C illustrate visual enhancements that may be applied to thumbnail icons. There are several types of visual treatments that can be applied to thumbnail images and some of these treatments may further scale down an image.

FIG. 6A illustrates a thumbnail image 600 and a type overlay 602. A border 604 is applied and the icon may be registered to receive such a treatment. For example, MICROSOFT WORD™ documents may be registered to have this treatment applied to them. The border may be applied solely to the thumbnail image 600 and not to the entire bounding box of the thumbnail icon.

FIG. 6B illustrates a thumbnail image 610 having a photo paper border 612. The photo paper border 612 may be applied to a thumbnail if the underlying file is an "image" type and the icon size meets requirements. A photo paper border may be applied to the thumbnail image if the thumbnail image is an image type and it is of a suitable predetermined size, such as 256, 128, 48 or 32 pixels. In this example, no photo paper border is applied at size 16.

Table 3 describes the photo paper border width at each thumbnail icon size in this example.

TABLE 3

| Icon Size | Photo Paper Border Width |
|---|---|
| 256 | 5 |
| 128 | 3 |
| 48 | 2 |
| 32 | 1 |
| 16 | No photo paper border. |

The width may be interpolated between the displayed sizes in a similar manner to the overlays shown in Table 2.

FIG. 6C illustrates a thumbnail image 620 having sprockets 622 and a type overlay 624. The sprockets may be applied to the thumbnail image 620, which may be a still image from a movie, to convey that it is a movie type. The sprockets include two images placed along the top and bottom of the thumbnail image 620 to make it look like a piece of film strip. A pair of sprockets may be applied to the thumbnail image if it is a perceived video type, and if the thumbnail icon size is of a predetermined size, such as 256, 128, 48, or 32 pixels. Again, in this example, no sprockets are applied at size 16. Table 4 describes the sprocket size at each thumbnail icon size in this example.

TABLE 4

| Icon Size | Sprocket Height |
|---|---|
| 256 | 18 |
| 128 | 10 |
| 48 | 6 |
| 32 | 4 |
| 16 | No sprockets. |

The top sprocket may be placed so that its bottom edge aligns with the top edge of the thumbnail image, and the bottom sprocket may be placed so that its top edge aligns with the bottom edge of the thumbnail image. If the thumbnail image has a height large enough to make the thumbnail image with the sprockets higher than X pixels, then the two sprockets may be moved closer to one another. The top sprocket may be moved down and the bottom sprocket may be moved up until the thumbnail image with the applied sprockets is no taller than the height X.

Other effects may include a gradient effect that may be applied to thumbnail image to make it more attractive. Furthermore, a shine effect may be applied to the thumbnail image if the object type has been registered to receive such a treatment. For example, POWERPOINT™ types may be registered to have this treatment applied to them. A thumbnail icon may also include a drop shadow effect or other visual effect.

VII. Using the Scaling Mechanism

Figure 7:
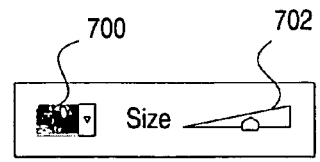
FIG. 7 illustrates a user scale for allowing a user to scale icons.

As set forth above, and as illustrated in FIG. 2, a user scaling module 250 receives user input, such as through a graphical user interface, for scaling. FIG. 7 illustrates a user scale for allowing a user to scale icons. Users can scale icons to certain predetermined sizes, such as between 16×16 and 256×256 pixels. An icon size slider 702 may be provided in a view pane. A view mode control 700 allows a user to switch between an icon mode and a details mode. A user can move the icon slider 702 to adjust the icon size. The icon size slider 702 may have snap points around sizes 16, 32, 48, 128, and 256. If the slide control indicates a size within a few pixels of one of the snap sizes, the icons will snap to that size. In some aspects, if the slider control is within four pixels in either direction of a snap size, the selected icons will be set at the snap size.

Additionally, a view menu may have an item labeled "Icon Size," with the following choices appearing off a submenu: Tiny, Small, Medium, Large, and Huge, or similar selections that correspond to icon sizes such as 16, 32, 48, 128, and 256. For example, the view menu may be a pull-down menu listing selectable options, and the listed menu options may be selected by clicking, right-clicking, etc.

As with others of the inputs described above, such inputs may be entered using a graphical element, such as a slider bar. Furthermore, users may be able to scale icons using a hardware input, such as a scroll wheel found on many mice. Moving the scroll wheel forward while holding down the CTRL key can increase the size of the icon and moving the scroller wheel backward while holding down the CTRL key can decrease the size of the icon.

In absence of user scaling, the icons may have default sizes. The following Table 5 describes example default sizes of icons in various folder locations.

TABLE 5

| Place | Default Icons Size | Default Details Size |
|---|---|---|
| Document Library | 48 | 16 |
| Photo/Video Library | 128 | 16 |
| Music/Radio Library | 48 | 16 |
| Contact Library | 48 | 48 |

If the user selection requires that the icon be scaled between snap sizes, the system utilizes a scaling mechanism including a mechanism for converting the icons to an appropriate format, such as a graphical texture provided by MICROSOFT DIRECTX™ graphics technology. A hardware accelerated scaling mechanism may implement a bilinear filter or other known mechanism to perform the actual icon scaling while maintaining visual fidelity of the image.

The scaling may occur in real-time by the icon scaling system 200. The real-time scaling can occur at draw time or optionally at other times.

VIII. Type Selection Process

Figure 8:
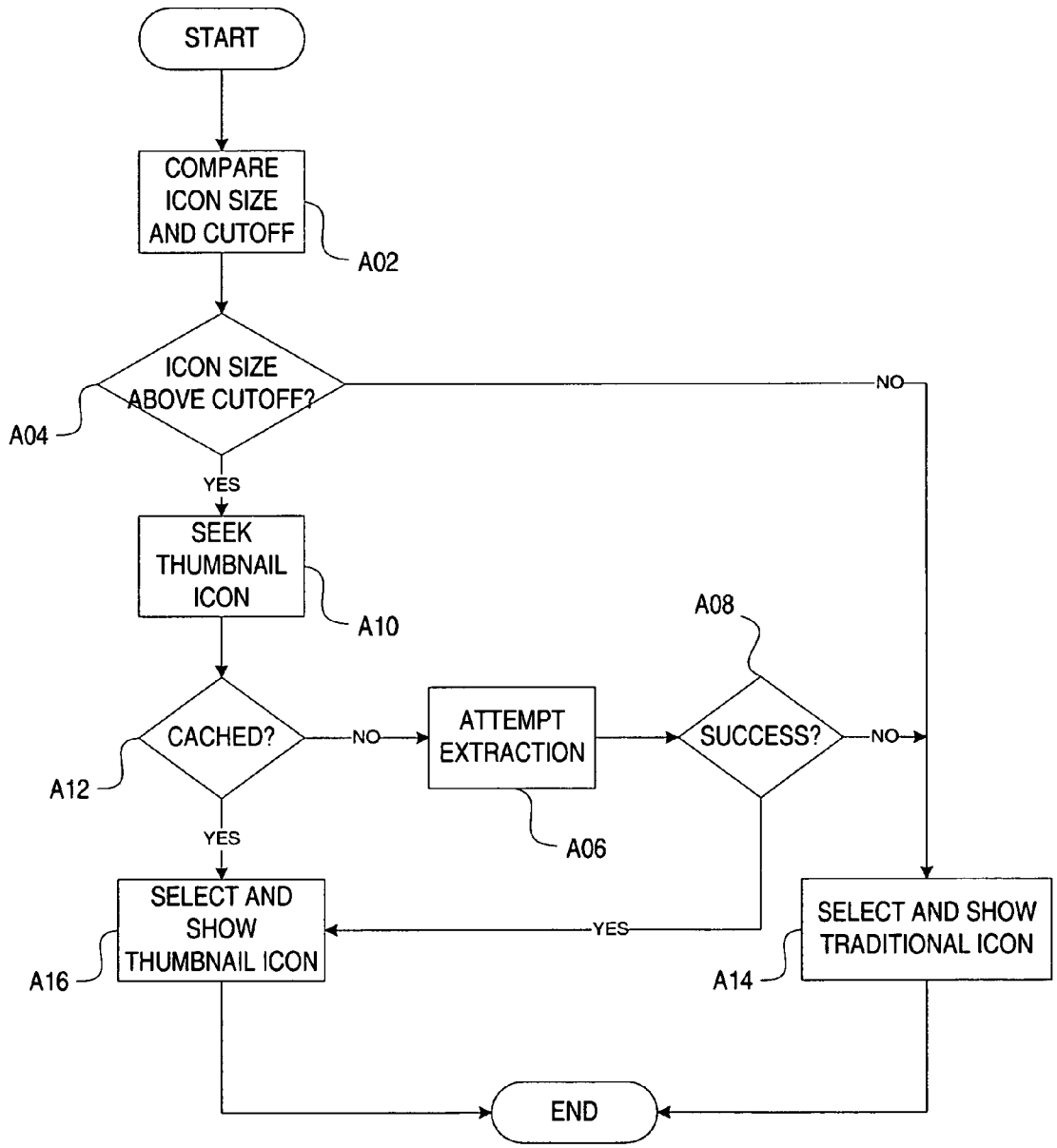
FIG. 8 is a flow chart illustrating a process for determining what type of icon to use.

FIG. 8 is a flow chart illustrating a process implemented by the type selection module 230, shown in FIG. 2, for determining which type of icon should be used after a user has selected a particular icon size as explained above with respect to FIG. 7. As set forth above with regard to FIG. 2 the selection of a thumbnail icon or traditional icon typically depends upon the scaling selection of the user.

In step A02, the system compares the icon size and a pre-set size cutoff. If the icon size is above the pre-set size cutoff in step A04, the system seeks a thumbnail icon in step A10. If the icon is not above the size cutoff in step A04, the system selects and shows a traditional item in step A14.

In step A10, the system seeks a thumbnail icon. If a thumbnail icon is not cached in step A12, the system attempts to extract it in step A06. If the thumbnail is not cached in step A12, or if the extraction is successful in step A08, the system selects and shows the thumbnail icon in step A16. If the extraction is unsuccessful in step A08, the system selects and shows the traditional icon in step A14.

Exemplary icon size cutoffs are illustrated in Table 6 below.

TABLE 6

| Perceived Item Type | Thumbnail/Icon Cutoff |
|---|---|
| Document | 32 |
| Folder | 32 |
| Picture | Always thumbnail |
| Video | Always thumbnail |
| Stack (Phodeo) | Always thumbnail |
| Song | Always thumbnail |
| Stack (Album) | Always thumbnail |
| Stack (Artist) | Always thumbnail |
| People | Always thumbnail |
| Groups | Always thumbnail |
| Devices | Always thumbnail |
| Internet Shortcuts | 16 |

IX. Resource Selection and Scaling Process

Figure 9:
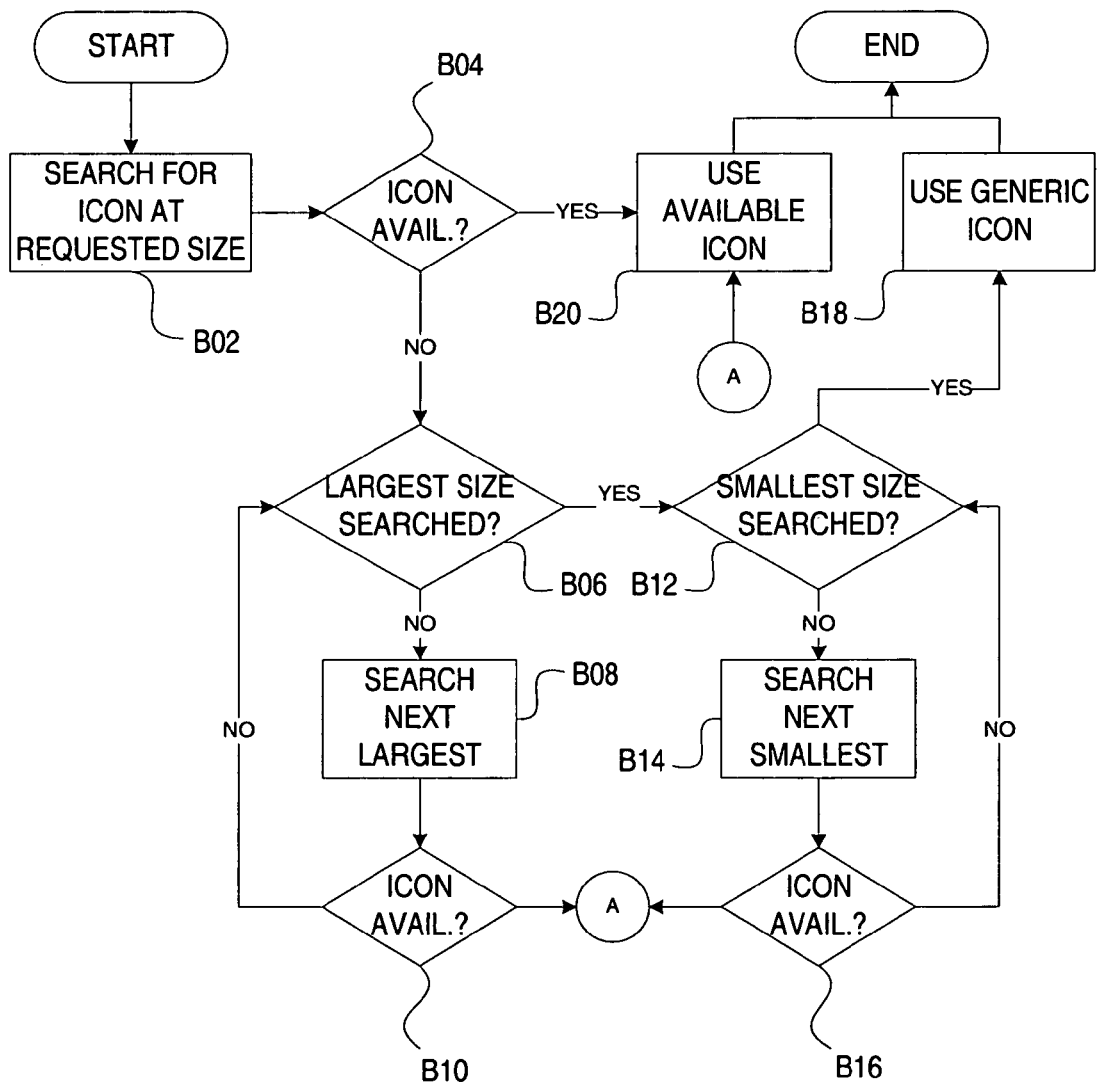
FIG. 9 is a flow chart illustrating a process for accessing image resources.

FIG. 9 illustrates a process for selection of an image resource by the resource selection module 210, illustrated in FIG. 2, after a user has scaled a selected icon.

As set forth above, the system may provide image snap sizes. The sizes might include for example 16, 32, 48, 128, and 256 pixels. For every item Y at any size X the system may choose the image at the best available size for Y. In step B02, the system searches for the appropriate sized image X. If X is a snap size and an image for Y is available at size X in step B04, then the system uses the available image at size X in step B20. If an image for Y is not available in size X, in step B04, then the system determines if the largest size was searched in step B06. If the largest size was not searched in step B06, the system searches the next largest size in step B08. If the next largest image is available in step B10, the system uses the available icon in step B20. If the image is not available in step B10, the system continues the search until the largest image has been searched.

Subsequently, in step B12, if the search for larger images representing Y was unsuccessful, the system determines if the smallest size has been searched. If the smallest size has not been searched, the system continues to search for the next smallest size in step B14. If the image is available in step B16, the system uses it in step B20. If the icon is not available and the smallest size has been searched in step B12, the system uses a generic image in step B18. If and only if no image can be found at any size, the system will show a generic image. Although the process above is described as considering larger images prior to smaller images, the reverse process is also encompassed.

If the user selection requires that the image be scaled between snap sizes, the system utilizes a scaling mechanism including a mechanism for converting the images to an appropriate format, such as DX9 textures. A hardware accelerated scaling mechanism may implement a bilinear filter to perform the actual image scaling. In addition to scaling the retrieved image, the system also attempts to re-extract at the correct size. The system uses the closest stored image it can find in the interim time. Once the system re-extracts, it displays the correctly sized image and also stores the new correctly sized image into a cache for subsequent retrieval. This extraction, display, store-into-cache sequence also occurs if the cache is empty and first displays the traditional icon.

Figure 10:
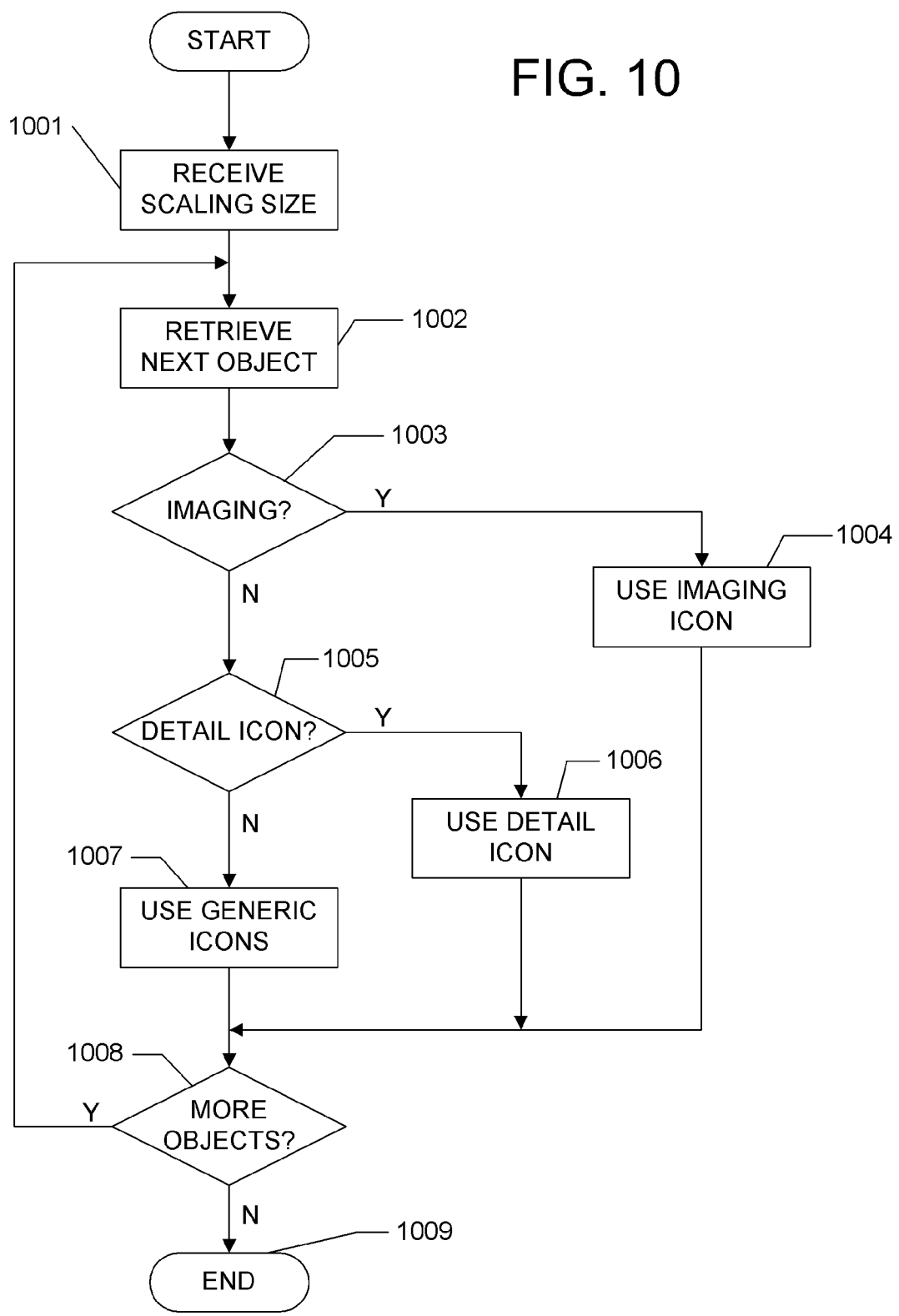
FIG. 10 is a flow chart illustrating an example process by which an icon may be selected for representing objects in a display.

The resource selection and/or scaling process may also use a variety of different types of icons depending on resource availability. For example, FIG. 10 depicts an example process in which the resource selection module 210 may select an appropriate icon for display. First, in step 1001, the system may receive an icon scaling size to be used for the icons appearing in the display. This may be based on a user preference, such as the scaling mechanism described above, or it may be done automatically by the system as a default or user setting from hardware and/or software inputs.

Once the icon scaling size is determined, the system may then proceed to step 1002, in which the next (or first) object to be displayed may be considered. The objects may be, for example, the various files, documents, data, etc. that are to be represented by the icons in the display. In step 1003, the system may check to see whether an imaging icon, having a reduced-size image displaying the current object's contents, is available for the current object. This may be accomplished using, for example, the resource selection process described above and shown in FIG. 9. Other approaches may also be used. For example, the system may make the determination based on whether a predefined imaging icon already exists for the current object. Alternatively, the system may make the determination based on the object type, or its data contents, to decide whether a suitable imaging icon may be generated for the display.

If, in step 1003, the system determines that a suitable imaging icon is available, the process may move to step 1004, in which that suitable imaging icon may be retrieved and/or generated, and used for the display of the current object. If, however, the system determines that no suitable imaging icon is available, the process may move to step 1005.

In step 1005, the system may check to see if a suitable detail icon is available for the object. A detail icon may be any displayable image whose appearance depends on the contents of the current object, but which falls short of an image of the object's contents. For example, the detail icon might not include a display showing the object's contents in visual form (e.g., a miniature image of a picture file), but it may include some indicia of a type (e.g., whether it is a word processing document, a text document, a spreadsheet, an audio file, a video file, etc.), status (e.g., whether it is editable, its age, when it was last edited, etc.), or other characteristic of the object. Although the detail icon does not have an image representation of the object's contents, the detail icon may still include helpful information identifying the current object. For example, some or all of the overlay information described above may be incorporated or added into the detail icon, such that the detail icon conveys information identifying one or more characteristics (e.g., object type, status, contents, etc.) of the object. For example, if the object is a word processing document (e.g., a MICROSOFT WORD™ document), but the system decided against displaying an image of the object's contents (perhaps the document text was too dense to be adequately represented as a thumbnail), the detail icon might display a symbol representing the fact that the object is a word processing document. The detail icon may include, for example, a type overlay identifying the document type, such as overlay 302b. Other object characteristics and/or overlay data may also be displayed in the detail icon.

The step 1005 determination may follow the same process used in the step 1003 determination, and may check to see if a suitable detail icon can be retrieved and/or generated for the current object. Alternatively, the system may be configured to avoid trying to generate detail icons, and may instead simply check to see if a predetermined detail icon (e.g., a preconfigured bitmap image) already exists in the system. Simplifying this step may lead to faster performance.

If, in step 1005, the system determines that a suitable detail icon is available for the object, the system moves to step 1006, and uses that suitable detail icon in the display for the current object. However, if no suitable detail icon is available, then the system may move to step 1007.

In step 1007, the system has determined that no suitable imaging or detail icons are available, and may use a generic icon to represent the current object in the display. A generic icon may be an image that identifies the existence of an object, but which provides minimal information regarding the file (or none at all). For example, a generic icon might be a plain shape, such as a square, or a blank sheet of paper, to represent the existence of an object. A generic icon may be a predefined image that is common to multiple objects, and in some instances, may have a constant appearance that does not vary with the object contents, type, status, etc. For example, a single generic icon may be defined for use with all objects of unknown file type to the system.

By step 1008, the system will have determined whether to use an imaging icon, a detail icon, or a generic icon for the current object, and may then check to see if any other objects are to be displayed. For example, if the FIG. 10 process is occurring in order to display the contents of a particular project folder, the step 1008 check may determine whether it has identified the appropriate icon (e.g., imaging, detail, or generic) for all objects to be displayed. If additional objects remain to be processed, the system may return to step 1002 to retrieve the next object and loop through the steps described above to identify an appropriate icon for the next object.

If no further objects remain to be processed, then the system may terminate the resource selection process in step 1009.

X. Conclusion

Using one or more of the features described above, various icon images may be generated. A different type of icon image may be selected based on the location of the file represented by the icon (e.g., files in a particular folder on the system all share a common icon) and/or the characteristics of the file (e.g., its metadata, type, how recently it was accessed and/or edited etc.). Additionally, icon images may be selected using contents of the file (e.g., a shortcut icon might retrieve the contents of the underlying file to determine the icon to be displayed).

Thus, icon scaling enables users to resize icons to any size in a range from a small size to a very large size, depending upon user preference. As an icon is resized, the appearance of the icon and the layout of the icons changes to best accommodate its new size.

Users can, in real-time, scale icons across the continuous range of possible sizes, and the scaling is visually appealing. Thumbnail icons may consistently convey what type of object they represent (e.g. Word Document, PowerPoint deck, video clip, etc.) even for thumbnail extractors written by ISVs. Overlays may be used in a consistent and reliable way as visual cues conveying some information about an item.

While particular features have been illustrated and described in detail herein, it should be understood that various changes and modifications might be made without departing from the scope and intent of the description herein. The features described herein are intended in all respects to be illustrative rather than restrictive. Alternatives will become apparent to those skilled in the art. For example, the scaling processes described above may work sufficiently well when scaling up and scaling down the icon size. As another example, although the description above refers to icons for underlying files, the system is not limited to representing files, and can be used for icons representing any item on a computing system, such as directories, shortcuts, etc.

From the foregoing it will be seen that the features described herein well adapted to attain some or all of the ends and objects set forth above. It will also be understood that certain features and sub-combinations may be employed without reference to other features and sub-combinations. For example, the steps in the processes described above may be rearranged and/or omitted as desired.

What is claimed is:

1. A method for displaying an icon representing an underlying item on a user interface of a computing system having a processor and memory, comprising the steps of:

receiving an indication from a user of a user-requested icon size to use for the interface;

for a first icon, employing a three-tier selection process to identify an icon for representing a first underlying item in the user interface, the three tier selection process is comprised of:

determining, based on the user-requested icon size, whether an imaging icon is available for an underlying item for which the three-tier selection process is being employed, wherein the imaging icon is comprised of a reduced-sized image displaying the content of the underlying item, and displaying said imaging icon if it is available at the user-requested icon size;

when said step of determining determines that the imaging icon is not available at the user-requested icon size, determining, based on the user-requested icon size, whether a detail icon is available, wherein the detail icon is comprised of an image whose appearance depends on the content of the underlying item, but which falls short of an image of the contents of the underlying item, and displaying said detail icon if it is available at the user-requested icon size; and when said steps of determining determines that no imaging icon is available at the user-requested icon size and no detail icon is available at the user-requested icon size, displaying a generic icon for said item, wherein the generic icon is comprised of an image that identifies the existence of the underlying item, but which provides minimal information regarding the underlying item;

for a second icon, employing the three-tier selection process to identify an icon for representing a second underlying item in the user interface; and displaying the first icon and the second icon concurrently in a common folder of a file management system represented by the user interface.

2. The method of claim 1, further comprising the step of providing the user with a list of predetermined icon sizes, and said indication is a user selection of one of said predetermined icon sizes.

3. The method of claim 1, further comprising searching a set of stored image resources that includes a set of images having a number of discrete sizes.

4. The method of claim 3, further comprising interpolating between discrete sizes to generate an icon between discrete sizes.

5. The method of claim 1, further comprising selecting and positioning an overlay in the vicinity of the first displayed icon based upon the selected size.

6. The method of claim 5, wherein an appearance of said overlay is based on a type of said first underlying item.

7. The method of claim 5, wherein an appearance of said overlay is based on a status of said first underlying item.

8. The method of claim 5, further comprising scaling the selected overlay based upon the user-requested icon size.

9. The method of claim 1, wherein said first icon is a predetermined icon retrieved from storage.

10. The method of claim 1, wherein said first icon is dynamically generated.

11. The method of claim 1, wherein said first underlying item is a file.

12. One or more computer storage media storing computer-executable instructions for performing the following steps:
receiving a user indication of a particular user-requested icon size for a user interface;
employing a first instance of a three-tier selection process to identify an icon for representing a first underlying item in said user interface based on the particular user-requested icon size, the first instance of the three-tier selection process first considering imaging icons that display contents of the first underlying item; second considering detail icons that do not display the contents of the first underlying item, but whose appearance varies depending on a characteristic of the first underlying item; and third considering generic icons;
generating a first icon for representing said first underlying item in the user interface based on results of said first instance of the three-tier selection process;
employing a second instance of a three-tier selection process to identify an icon for representing a second underlying item in said user interface based on the particular user-requested icon size, the second instance of the three-tier selection process first considering imaging icons that display contents of the second underlying item; second considering detail icons that do not display the contents of the second underlying item, but whose appearance varies depending on a characteristic of the second underlying item; and third considering generic icons;
generating a second icon for representing said second underlying item in said user interface based on results of said second instance of the three-tier selection process; and displaying the first icon and the second icon concurrently in a common folder of a file management system represented by the user interface.

13. The one or more media of claim 12, wherein said instructions for performing said step of generating the first icon includes computer-executable instructions for retrieving a predefined icon image.

14. The one or more media of claim 13, wherein said instructions for performing said step of generating the first icon further includes computer-executable instructions for modifying said predefined icon image based on a characteristic of the first underlying item.

15. The one or more media of claim 12, wherein said first underlying item is an image file storing data for a visual image, and wherein said instructions for said step of generating the first icon further includes computer-executable instructions for retrieving contents of said image file, and including a display version of said visual image with said first icon.

16. The one or media of claim 15, wherein said instructions for performing said step of generating the first icon further includes computer-executable instructions for adding a border element to said image.

17. The one or more media of claim 12, further comprising instructions for including a type overlay with said first icon.

18. The one or more media of claim 12, further comprising instructions for including a status overlay with said first icon.

19. The one or more media of claim 12, wherein said first underlying item is a file.

20. One or more computer storage media storing computer-executable instructions for performing the following steps:
receiving a user indication of a user-requested icon size for a user interface;
employing a three-tier selection process to identify an icon for representing an underlying item in said user interface based on the user-requested icon size, the selection process first considering imaging icons that display contents of the underlying item; second considering detail icons that do not display the item's contents, but whose appearance varies depending on a characteristic of the item; and third considering generic icons;
identifying a first identified icon for basing a first icon on, the first icon representing a first underlying item utilizing the three-tier selection process, wherein the identification includes,
(a) determining if a first imaging icon is available at the user-requested icon size, if the first imaging icon is available at the user-requested icon size, the first imaging icon is the first identified icon,
(b) if the first imaging icon is not available at the user-requested icon size, determining if a first detail icon is available as the user-requested icon size, if the first detail icon is available at the user-requested icon size, the first detail icon is the first identified icon,
(c) if the first detail icon is not available at the user-requested icon size, a first generic icon is the first identified icon,
generating the first icon for representing said first underlying item based on the first identified icon, wherein said step of generating the first icon further includes a step of dynamically scaling an image for said first icon in accordance with said user-requested icon size; and identifying a second identified icon for basing a second icon on, the second icon representing a second underlying item utilizing the three-tier selection process, wherein the identification includes, (a) determining if a second imaging icon is available at the user-requested icon size, if the second imaging icon is available at the user-requested icon size, the second imaging icon is the second identified icon, (b) if the second imaging icon is not available at the user-requested icon size, determining if a second detail icon is available as the user-requested icon size, if the second detail icon is available at the user-requested icon size, the second detail icon is the second identified icon, (c) if the second detail icon is not available at the user-requested icon size, a second generic icon is the second identified icon, generating the second icon for representing said second underlying item based on the second identified icon, wherein said first icon and said second icon are displayed concurrently in a common folder of a file management system represented by the user interface, further wherein said step of generating the second icon includes a step of dynamically scaling an image for said second icon in accordance with said user-requested icon size.

* * * * *